US005666806A

United States Patent [19]

Dietz

[11] Patent Number: 5,666,806

[45] Date of Patent: Sep. 16, 1997

[54] CONTROL SYSTEM FOR A HYDRAULIC CYLINDER AND METHOD

[75] Inventor: Hans P. Dietz, Peoria, Ill.

[73] Assignee: Caterpillar Inc., Peoria, Ill.

[21] Appl. No.: 498,558

[22] Filed: Jul. 5, 1995

[51] Int. Cl.[6] ............................ F16D 31/02; F15B 13/16

[52] U.S. Cl. ................................ 60/327; 60/496; 60/452; 91/361

[58] Field of Search ............................ 60/327, 452, 445, 60/446, 451, 459; 91/361

[56] References Cited

U.S. PATENT DOCUMENTS

| | | | |
|---|---|---|---|
| 4,643,074 | 2/1987 | Gunda et al. | 91/361 |
| 4,714,005 | 12/1987 | Leemhius | 91/361 |
| 4,759,183 | 7/1988 | Kretia et al. | 60/445 X |
| 4,768,339 | 9/1988 | Aoyagi et al. | 60/427 |
| 4,884,402 | 12/1989 | Strenzice et al. | 60/445 X |
| 4,991,491 | 2/1991 | Neumann | 91/361 |
| 5,012,722 | 5/1991 | McCormick | 91/361 |
| 5,073,091 | 12/1991 | Burgess et al. | 60/222 |
| 5,178,053 | 1/1993 | Rudich, Jr. | 91/361 |
| 5,218,895 | 6/1993 | Lukich et al. | 91/361 |
| 5,249,421 | 10/1993 | Lunzman | 60/422 |
| 5,261,234 | 11/1993 | Holloway et al. | 60/462 |
| 5,267,441 | 12/1993 | Devier et al. | 60/452 |
| 5,297,381 | 3/1994 | Eich et al. | 60/452 |
| 5,357,878 | 10/1994 | Hare | 91/361 X |

FOREIGN PATENT DOCUMENTS 0190703 8/1986 European Pat. Off. .

OTHER PUBLICATIONS

Alleyne and Hedrick, Nonlinear Adaptive Control of Active Suspensions Mar. 1995.

Isidori, Nonlinear Control, 1989 pp. 145–288.

Vossoughi and Donath, "Dynamic Feedback Linearization for Electro–hydraulically actuated Servosystems" ASME 1992.

*Primary Examiner*—Hoang Nguyen

*Attorney, Agent, or Firm*—Steven G. Kibby; Thomas J. Bluth

[57] ABSTRACT

Apparatus and method for controlling at least one hydraulic cylinder by the hydraulic fluid discharged by a hydraulic pump through a control valve. The hydraulic control system includes sensors to sense the conditions of the system and produce responsive signals. In the first stage, a controller determines an initial pump displacement output value and an initial spool displacement output value as a function of the system condition signals according to a plurality of feedback linearization control laws. In the second stage, a second controller produces an output signal for the hydraulic pump and an output signal for the control valve as a function of the initial pump displacement output value, the initial spool displacement value and an input command signal according to linear control laws.

12 Claims, 2 Drawing Sheets

CONTROL SYSTEM FOR A HYDRAULIC CYLINDER AND METHOD

TECHNICAL FIELD

This invention relates generally to a control for a hydraulic actuator, and more particularly, to a method and apparatus for using feedback linearization to achieve more accurate and robust control of a hydraulic cylinder.

BACKGROUND ART

Hydraulic systems are utilized in many forms of construction equipment such as hydraulic excavators, backhoe loaders, and wheel loaders. The equipment is usually mobile having either wheels or tracks and includes a number of hydraulically actuated devices such as hydraulic cylinders and motors. In most cases, hydraulic systems are controlled by a valve arrangement in which a hydraulic pump provides pressurized fluid to a plurality of valves each associated with a hydraulic cylinder or motor. As an operator manipulates control levers located in the operator's compartment, hydraulic valves are controllably opened and closed such that pressurized fluid is controllably directed to the desired cylinder or motor.

When the rod/head assembly in a hydraulic cylinder is required to move in response to a operator command, it is important that it moves to the desired position in an accurate and robust manner. Achieving such accurate control is challenging because the system is fundamentally non-linear and is exposed to many disturbances including, inter alia, temperature changes, component wear, and varying external loads.

The most effective method of controlling hydraulic actuator systems is to use linear control theory. However, it is necessary to first linearize the system before linear control theory can be applied. Currently, the most common method of linearizing a system involves Taylor Series linearization whereby a system is linearized with respect to small perturbations in the states, inputs, and disturbances about a selected operating or equilibrium point. A linear control law can then be designed to provide good performance under the small perturbation constraint. This method's drawback is that predictable performance is only assured if the system stays close to the particular point about which it was linearized. It is generally accepted that controlling a nonlinear system with a linear control law based on a linear system that is constrained to an equilibrium point is undesirable for most hydraulic systems.

Gain scheduling is also presently used in the art to control a hydraulic actuator. The technique models the non-linear system as a plurality of linear systems centered about their selected operating or equilibrium points. Each linear system has an associated linear control law. In operation, when the system moves from one equilibrium point to another, the neighboring linear control laws are blended together. This approach is inherently discrete since a finite number of linear control laws are used to control a continuous motion of a nonlinear system. In addition, the software implementation of gain scheduling dramatically increases in complexity as the number of states and points of linearization increase.

The present invention is directed to overcoming one or more of the foregoing problems associated with known hydraulic control systems for cylinders.

DISCLOSURE OF THE INVENTION

In one aspect of the invention, a method for controlling a hydraulic actuating system is provided. The method includes receiving a command signal associated with the desired position of a hydraulic cylinder, sensing a plurality of system conditions and producing a plurality of control system condition signals, determining an initial pump displacement output value and an initial spool displacement output value as a function of the command signal and the plurality of system condition signals in accordance with a plurality of feedback linearization control laws, and producing a pump displacement output signal and a spool displacement output signal as a function of the initial pump displacement output value and the initial spool displacement value according to linear control laws.

In a second aspect of the invention, a hydraulic control system is provided. The hydraulic control systems includes, a hydraulic cylinder, a control valve, a hydraulic pump, a plurality of sensors for sensing a plurality of system conditions and producing a plurality of system condition signals, a first control means for determining an initial pump displacement output value and an initial spool displacement output value as a function of an input command signal and the plurality of system condition signals in accordance with a plurality of feedback linearization control laws, and a second control means for producing a pump displacement output signal for the hydraulic pump and a spool displacement output signal for the control valve as a function of the initial pump displacement output value and the initial spool displacement value according to linear control laws.

The invention also includes other features and advantages which will become apparent from a more detailed study of the drawings and specification.

DETAILED DESCRIPTION OF A PREFERRED EMBODIMENT OF THE INVENTION

Figure 1:
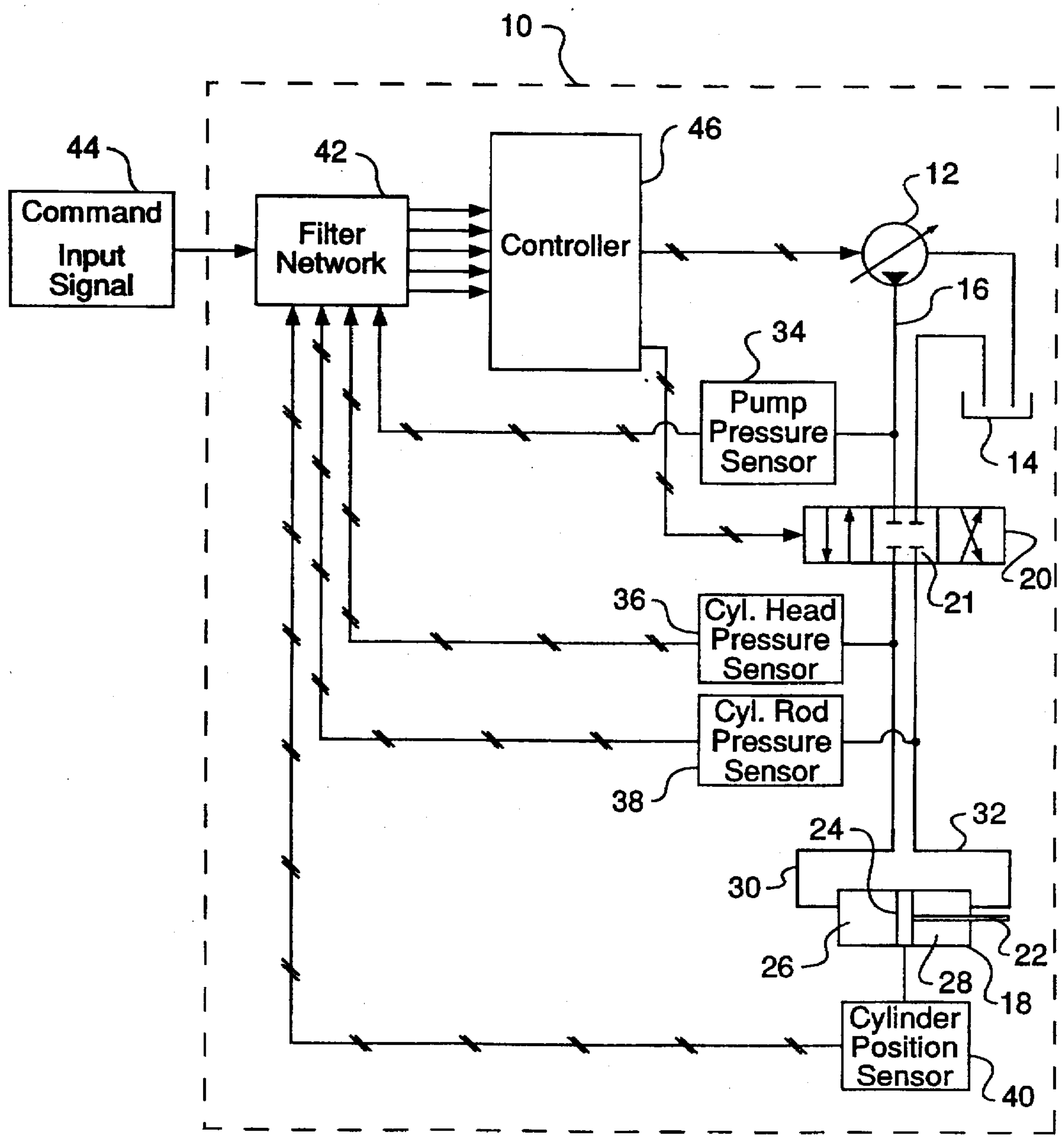
FIG. 1 is a block diagram of a control system for a hydraulic cylinder.

As shown in FIG. 1., a hydraulic control system 10 includes a variable displacement hydraulic pump 12 for delivering fluid under pressure from a fluid reservoir 14 to a supply line 16, and a hydraulic cylinder 18. A control valve 20 is connected to the hydraulic pump 12 via supply line 16 and operates to control the flow of the hydraulic fluid to the hydraulic cylinder 18.

The hydraulic cylinder 18 includes a piston head 24 and a piston rod 22 extending out of the hydraulic cylinder 18 which is moveable translationally within the hydraulic cylinder 18. The cylinder itself is comprised of a cylinder head chamber 26 and a cylinder rod chamber 28. The chambers 26,28 are defined by the relative position of the piston head 24 and vary in volume according to the position of the piston head 24.

The control valve 20 includes a single control spool 21. A split-spool valve may also be used and will be discussed in greater detail hereafter. The control valve 20 is connected to the hydraulic cylinder 18 via a first hydraulic fluid line 30 and a second hydraulic fluid line 32. The first hydraulic fluid line 30 is connected to the cylinder head chamber 26 and the second hydraulic fluid line 32 is connected to the cylinder rod chamber 28.

Sensors are positioned in the system to measure various system conditions or states of the system. For example, a pump pressure sensor is connected to the supply line 16 to sense pump pressure and generate a system condition signal responsive to the pump pressure.

A cylinder head pressure sensor 36 is connected to the first hydraulic fluid line 30 to sense the cylinder head pressure and generate a system condition signal responsive to the cylinder head pressure. A cylinder rod pressure sensor 38 is connected to the second hydraulic fluid line 32 to sense cylinder rod pressure and generate a system condition signal responsive to the cylinder rod pressure. A cylinder position sensor 40 is connected to the hydraulic cylinder 18 to sense cylinder position and generate a system condition signal responsive to the cylinder position.

The system condition signals are delivered to a filter network 42 to eliminate unwanted electrical noise. The filter network 42 includes a plurality of low-pass filters. The command input signal 44 is also delivered to the filter network 42. The command input signal 44 corresponds to the desired cylinder position.

The system condition signals and the command signal input signal are delivered to the controller 46. The controller 46 outputs control signals corresponding to the pump displacement for the hydraulic pump 12 and control spool displacement for the control valve 20.

The hydraulic control system 10 shown in FIG. 1 can be defined by five basic signals or states: cylinder position, pump pressure, cylinder head pressure, cylinder rod pressure, and cylinder velocity. Cylinder velocity can be obtained by differentiating cylinder position or a separate sensor can be used to sense cylinder velocity and generate an appropriate system condition signal. It is more efficient to differentiate cylinder position to obtain cylinder velocity. The states for the system shown in FIG. 1 are:

$\chi(t)$—Cylinder Displacement (M)

$\dot{\chi}(t)$—Cylinder Velocity (M/Sec)

$P_c(t)$—Cylinder Pressure (Pa)

$P_p(t)$—Pump Pressure (Pa)

Cylinder pressure is represented in the equation format for the system as a single state because the controller 46 pressurizes either the cylinder rod pressure or the cylinder head pressure depending on the desired direction of motion of the dual-acting cylinder. For example, when the cylinder rod pressure is positive, the hydraulic fluid in the cylinder head chamber 26 is removed to the hydraulic fluid reservoir 14. Likewise, when the cylinder head pressure is positive, the hydraulic fluid in the cylinder rod chamber 28 is removed to the hydraulic fluid reservoir. This manner of operation allows the system to define cylinder pressure as either cylinder head pressure or cylinder rod pressure depending on the direction of the motion.

The inputs to the hydraulic control system 10 shown in FIG. 1 are:

$X_{cs}(t)$—Control Spool Displacement (M)

$\eta(t)$—Pump Displacement ($M^3$/Rad)

The control valve 20 shown in FIG. 1 with the single control spool 21 meters flow into the hydraulic cylinder 18. A split-spool valve could be substituted for the single spool 21. If a spilt-spool valve system is utilized there will be an additional input to the system. Accordingly, there will also be an additional feedback linearization control law. In the case of a split-spool arrangement, the unactuated pressure can be controlled to achieve a degree of additional accuracy performance. However, the additional cost associated with a split-spool arrangement is prohibitive for the degree of additional accuracy achieved.

The output of the hydraulic control system 10 is:

$\chi(t)$—Cylinder Displacement (M)

The key physical parameters that need to be taken into account to define the hydraulic system's model shown in FIG. 1 are:

$M_c$=Mass of cylinder rod/and head (Kg)

$A_c$=Area of cylinder head ($M^2$)

Bc=Cylinder viscous friction (N Sec/M)

$\beta$=Bulk modulus of hydraulic oil (PA)

$\rho$=Density of hydraulic oil (Kg/$M^3$)

$V_1$=Trapped volume between valve and cylinder($M^3$)

$W_s$=Area gradient of spool (M)

$C_d$=Turbulent flow coefficient (unitless )

$V_p$=Trapped volume between pump and valve ($M^3$)

$K_1$=Pump leakage coefficient ($M^3$/Sec PA)

The key disturbances acting on the hydraulic control system 10 shown in FIG. 1 are:

$F_1$=Load force (N)

N=Drive shaft rotation of pump (Rad/Sec)

To derive the feedback linearization control laws for the hydraulic control system 10, it is necessary to model the system shown in FIG. 1 in accordance with the equations of the motion and the physical parameters that define the system. Equation (1), shown below, describes the forces acting upon the hydraulic cylinder 18 and is obtained by using Newton's second law to set the total force acting on the hydraulic cylinder 18 equal to the sum of the external forces acting upon it.

$$M_c\ddot{\chi}=A_cP_c-B_c\dot{\chi}-F_1 \tag{1}$$

Equation (2), shown below, describes the rate of change of the pressure of the hydraulic cylinder 18 and is obtained from the law of flow continuity.

$$\dot{P}_c=\frac{\beta(q_c-A_c\dot{\chi})}{V_C} \tag{2}$$

Equation (3), shown below, describes the rate of change of the actuated pressure of the hydraulic pump 12 and is also obtained from the law of flow continuity.

$$\dot{P}_p=\frac{\beta(q_p-q_c-K_1P_p)}{V_p} \tag{3}$$

Equation (4), shown below, describes the flow that occurs through the metering orifice of the single control spool 21 into the hydraulic cylinder 18.

$$q_c=C_dA_c\sqrt{2(P_p-P_c)/\rho} \tag{4}$$

Equation (5), shown below, describes the pump flow of the hydraulic pump 12.

$$q_p=N\eta \tag{5}$$

Equation (6), shown below, defines the area that is opened by the single control spool 21 as a rectangular port.

$$A_c=W_cX_{cs} \tag{6}$$

Equation (7), shown below, describes the pressurized volume within the hydraulic cylinder 18.

$$V_c=V_1+A_c\chi \tag{7}$$

Substituting Equations (4)–(7) into (1)–(3) provides the following equations:

$$M_c\ddot{\chi} = A_c P_c - B_c\dot{\chi} - F_1 \tag{8}$$

$$\dot{P}_c = \frac{\beta(C_d W_c X_{cs}\sqrt{2(P_p - P_c)/\rho} - A_c\dot{\chi})}{V_1 + A_c\chi} \tag{9}$$

$$\dot{P}_p = \frac{\beta(N\eta - C_d W_c X_{cs}\sqrt{2(P_p - P_c)/\rho} - K_1 P_p)}{V_p} \tag{10}$$

Representing Equations (8)–(10) in state space provides the following equations:

$$\dot{\chi}_1 = X_2 \tag{11}$$

$$\dot{\chi}_2 = \frac{A_c\chi_3 - B_c\chi_2 - F_1}{M_c} \tag{12}$$

$$\dot{X}_3 = \frac{\beta(C_d W_c X_{cs}\sqrt{2(X_4 - x_3)/\rho} - A_c X_2)}{V_1 + A_c\chi_1} \tag{13}$$

$$\dot{X}_4 = \frac{\beta(N\eta - C_d W_c X_{cs}\sqrt{2(X_4 - X_3)/\rho} - K_1 X_4)}{V_p} \tag{14}$$

The states for the Equations (11)–(14) are defined as:

$\chi_1=\chi$ (cylinder displacement)

$\chi_2=\dot{\chi}$ (cylinder velocity)

$\chi_3=P_c$ (cylinder pressure)

$\chi_4=P_p$ (pump pressure)

Equations (11)–(12) are linear with respect to the states while Equations (13)–(14) are non-linear with respect to the states. The use of the feedback linearization method globally linearizes differential Equations (13)–(14) and transforms the nonlinear plant (11)–(14) to a specified global linear and time-invariant system. The two inputs to the system, control spool displacement, and pump displacement, are used to execute the feedback linearization control laws.

The first feedback linearization law is derived by setting the cylinder pressure dynamics equal to a predetermined linear equation:

$$\dot{\chi}_3 = f_3 = \alpha_1\chi_1 + \alpha_2\chi_2 + \alpha_3\chi_3 + \alpha_4\chi_4 + \mu_1 \tag{15}$$

In Equation (15), the constants $\alpha_1$ through $\alpha_4$ are preselected real numbers and $\mu_1$ is a new input that is calculated in the second stage of the control process. The following identity is formed by setting Equation (13) equal to Equation (15):

$$\dot{\chi}_3 = \frac{\beta(C_d W_c X_{cs}\sqrt{2(\chi_4 - \chi_3)/\rho} - A_c\chi_2)}{V_1 + A_c\chi_1} = f_3 \tag{16}$$

The first feedback linearization control law is derived by solving for the required control spool position in Equation (16):

$$X_{cs} = \frac{\frac{(V_1 + A_c\chi_1)f_3}{\beta} + A_c\chi_2}{C_d W_c\sqrt{2(\chi_4 - \chi_3)/\rho}} \tag{17}$$

The first feedback linearization control law which calculates spool position transforms the nonlinear cylinder pressure dynamics in Equation (13) to the linear cylinder pressure dynamics specified in Equation (15).

In the same way, a feedback linearization control law is derived for the pump pressure. The second feedback linearization control law is derived by setting the pump pressure dynamics equal to a predetermined linear equation:

$$\dot{\chi}_4 = f_4 = \beta_1\chi_1 + \beta_2\chi_2 + \beta_3\chi_3 + \beta_4\chi_4 + \mu_2 \tag{18}$$

In Equation (18), the constants $\beta_1$ through $\beta_4$ are preselected real numbers and $\mu_2$ is a new input that is calculated in the second stage of the control process. The following identity is formed by setting Equation (14) to Equation (18):

$$\dot{\chi}_4 = \frac{\beta(N\eta - K_1\chi_4 - C_d W_c X_{cs}\sqrt{2(\chi_4 - \chi_3)/\rho})}{V_p} = f_4 \tag{19}$$

The second feedback linearization control law is derived by solving for the required pump displacement in Equation (19):

$$\eta = \frac{\frac{V_p f_4}{\beta} + K_1\chi_4 + C_d W_c X_{cs}\sqrt{2(\chi_4 - \chi_3)/\rho}}{N} \tag{20}$$

The second feedback linearization control law, which calculates pump displacement, transforms the nonlinear pump pressure dynamics in Equation (14) to the linear pump pressure dynamics specified in Equation (18).

The two interdependent feedback linearization control laws derive a spool position and pump displacement that will result in a cancelling of the non-linear dynamics and leave the system in a state where linear control can be applied in the second stage of the control process to achieve the desired performance. Using well-known linear control methods such as pole placement, LQR, LQD, and regular PID, linear control laws can be derived for $\mu_1$ and $\mu_2$ to place the poles of the new linear system to a location where desired performance is achieved and where disturbances will not effect the desired performance.

Figure 2:
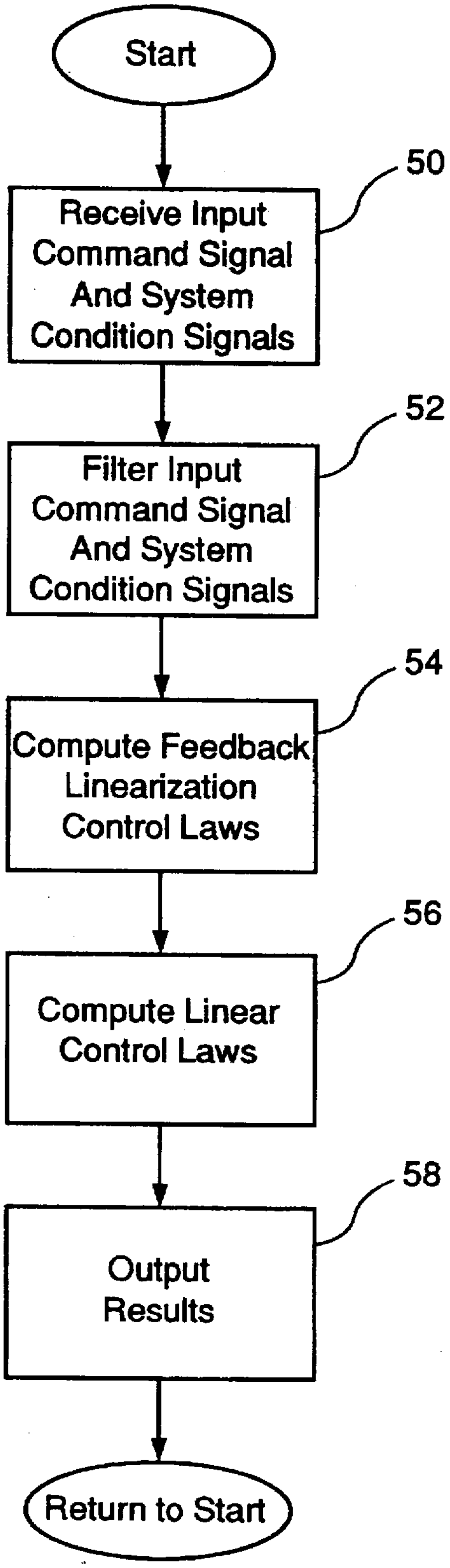
FIG. 2 is a flow chart of a series steps followed in control process.

More specifically, in the control operation flow chart shown in FIG. 2, the input command signal 44 is received in block 50. The input command signal 44 corresponds to the desired cylinder position. In operation, the input command signal 44 is responsive to operator input. For example, the hydraulic control system 10 can be used to control the movement of a particular implement on a construction machine such as a blade, bucket, or shovel. The operator manipulates control levers to move the implement to a desired position corresponding to a particular cylinder position. The hydraulic control system 10 can be used to control a number of different systems including, inter alia, fuel injection systems, implement systems, and steering mechanisms. In addition, in block 50, system condition signals corresponding to the sensed system conditions are received. The hydraulic control system 10 continually senses the system conditions and delivers updated system condition signals to the filter network 42 and the controller 46.

In block 52, the input command signal and the system condition signals are filtered to eliminate unwanted electrical noise by the filter network 42. As described above, the filter network 42 includes a plurality of low-pass filters.

At block 54, the feedback linearization control laws are computed. An initial pump displacement output value and an initial spool displacement value are derived from a plurality of feedback linearization control laws for the system (Equations (17) and (20)). The feedback linearization laws utilize the sensed system condition signals and the input command signal. Accordingly, the computed initial pump displacement output value and the initial spool displacement value are a function of the system condition signals and the input command signal. The initial pump displacement output value and the initial spool displacement output value, derived from the feedback linearization control laws for the system, are interrelated. If only one of the outputs, either pump displacement or spool displacement, was controlled by a feedback linearization control law, the non-linear dynamics would be shifted to the state not controlled by a feedback linearization control law. One skilled in the art would recognize that additional hydraulic cylinders could be attached to the base system shown in FIG. 1. The addition of another hydraulic cylinder would involve the addition of additional control valve and associated sensors and hydraulic fluid lines. A third feedback linearization control law, spool displacement for the second control valve, would be needed and can be derived in the same manner that the control law for spool displacement for the initial control valve was derived. In addition, the feedback linearization control law for pump displacement would have to be re-derived to account for the additional feedback linearization control law associated with the second spool. Thus, the system would not be adversely effected by the use of multiple implements because the feedback linearization laws are inter-related.

At block 56, the standard linear control laws are computed. Previously, at block 54, the use of the feedback linearization control laws cancels the non-linear dynamics of the system. At block 56, well-known linear control methods such as pole placement, LQR, LQD, and regular PID, can be used to derive linear control laws to place the poles of the new linear system to a location where desired performance is achieved and where disturbances will not effect desired performance. A pump displacement output signal and a spool displacement output signal are produced as a function of the initial pump displacement output value and initial spool displacement output value in accordance with the selected standard linear control method.

The architecture for the control of the system involving blocks 54, 56 is, in essence, an outer loop and an inner loop process. The inner-loop, block 54, cancels the nonlinear pressure dynamics while the outer loop implements the standard linear feedback control law.

The results of the control process executed in blocks 54, 56 are outputted to the system in block 58.

Industrial Applicability

The hydraulic control system 10 is advantageously used in construction equipment such as hydraulic excavators, backhoe loaders and wheel loaders. The hydraulic cylinder 18 of the hydraulic control system 10 may be, inter alia, a bucket cylinder or a boom cylinder. The hydraulic control system 10 utilizes feedback linearization to achieve more accurate and robust control of the hydraulic cylinder 18.

Referring to FIG. 1, the command input signal 44, indicative of a desired cylinder position of the hydraulic cylinder 18, is responsive to operator input. The command signal 44 and the sensed system condition signals, indicative of the states of the system, are delivered to the filter network 42 to eliminate unwanted electrical noise and is then delivered to the controller 46.

Within the controller 46, an initial pump displacement output value and an initial spool displacement output value are computed as a function of the input command signal 44 and the sensed system condition signals according to a plurality of feedback linearization control laws which cancel the non-linear pressure dynamics of the system. Then a pump displacement output signal for the hydraulic pump 12 and a spool displacement output signal for the control valve 21 are computed as a function of the initial pump displacement output value and the initial spool displacement output value according to standard linear control laws.

The hydraulic pump 12 and the control valve 20 are thus controlled to achieve the desired position for the hydraulic cylinder 18.

Other aspects, objects, and advantages of this invention can be obtained from a study of the drawings, the disclosure, and the appended claims.

I claim:

1. A method for controlling a hydraulic actuating system, the hydraulic actuating system including a hydraulic pump, a control valve, a hydraulic cylinder, and a microprocessor, the method comprising the steps of:

receiving an input command signal associated with the desired position for the hydraulic cylinder;

sensing a plurality of system conditions and producing a plurality of system condition signals according to said plurality of system conditions;

determining an initial pump displacement output value and an initial spool displacement output value as a function of said plurality of system condition signals, said initial pump displacement output value and said initial spool displacement output value being derived from a plurality of feedback linearization control laws; and producing a pump displacement output signal and a spool displacement output signal as a function of said initial pump displacement output value, said initial spool displacement output value and said input command signal, said pump displacement output signal and said spool displacement output signal being derived from at least one linear control law.

2. A method, as set forth in claim 1, including the step of filtering said plurality of system condition signals.

3. A method, as set forth in claim 1, wherein said plurality of system conditions includes cylinder position, cylinder rod pressure, cylinder head pressure, and pump pressure.

4. A method, as set forth in claim 3, including the further step of determining cylinder velocity by differentiation techniques from said system parameter of cylinder position.

5. A method, as set forth in claim 1, wherein said plurality of system conditions includes cylinder position, cylinder velocity, cylinder rod pressure, cylinder head pressure, and pump pressure.

6. A hydraulic control system, comprising:

a hydraulic cylinder;

a control valve adapted to regulate the flow of pressurized hydraulic fluid to said hydraulic cylinder;

a hydraulic pump adapted to provide pressurized hydraulic fluid through said control valve to said hydraulic cylinder;

a plurality of sensors for sensing a plurality of system conditions and producing a plurality of system condition signals;

a first control means for determining an initial pump displacement output value and an initial spool displacement output value as a function of said plurality of system conditions signals, said initial pump displacement output value and said initial spool displacement output value being derived from a plurality of feedback linearization control laws; and a second control means for producing a pump displacement output signal for said hydraulic pump and a spool displacement output signal for said control valve as a function of said initial pump displacement output value, said initial spool displacement output value and an input command signal, said pump displacement output signal and said spool displacement output signal being derived from at least one linear control law.

7. A hydraulic control system, as set forth in claim 6, including means for filtering said plurality of system condition signals.

8. A hydraulic control system, as set forth in claim 6, wherein said control valve includes a single spool.

9. A hydraulic control system, as set forth in claim 6, wherein said control valve includes a split spool.

10. A hydraulic control system, as set forth in claim 6, wherein said plurality of system conditions includes cylinder position, cylinder rod pressure, cylinder head pressure, and pump pressure.

11. A hydraulic control system, as set forth in claim 10, including means for determining cylinder velocity by differentiation techniques from said system condition of cylinder position.

12. A hydraulic control system, as set forth in claim 6, wherein said plurality of system conditions includes cylinder position, cylinder velocity, cylinder rod pressure, cylinder head pressure, and pump pressure.

* * * * *